United States Patent
Chen

(10) Patent No.: US 11,074,086 B2
(45) Date of Patent: Jul. 27, 2021

(54) SYSTEMS AND METHODS FOR AUTOMATICALLY CHANGING APPLICATION START STATE BASED ON DEVICE ORIENTATION

(71) Applicant: Facebook, Inc., Menlo Park, CA (US)

(72) Inventor: Evan Lee Chen, Menlo Park, CA (US)

(73) Assignee: Facebook, Inc., Menlo Park, CA (US)

( * ) Notice: Subject to any disclaimer, the term of this patent is extended or adjusted under 35 U.S.C. 154(b) by 752 days.

(21) Appl. No.: 15/702,251

(22) Filed: Sep. 12, 2017

(65) Prior Publication Data

US 2019/0079778 A1 Mar. 14, 2019

(51) Int. Cl.
| | | |
|---|---|---|
| *G06F 9/445* | (2018.01) | |
| *G06F 3/14* | (2006.01) | |
| *G06F 3/041* | (2006.01) | |
| *G06F 3/0487* | (2013.01) | |
| *G06F 3/0488* | (2013.01) | |
| *G06F 3/03* | (2006.01) | |

(Continued)

(52) U.S. Cl.
CPC ........ *G06F 9/44505* (2013.01); *G06F 1/1626* (2013.01); *G06F 3/0304* (2013.01); *G06F 3/0412* (2013.01); *G06F 3/0485* (2013.01); *G06F 3/0487* (2013.01); *G06F 3/0488* (2013.01); *G06F 3/1407* (2013.01); *G06F 3/14* (2013.01); *G06F 2200/1637* (2013.01); *G06Q 50/01* (2013.01); *G09G 2340/0492* (2013.01)

(58) Field of Classification Search
CPC .. G06F 9/44505; G06F 3/0488; G06F 3/0304; G06F 1/1626; G06F 3/0485; G06F 3/1407; G06F 3/0412; G06F 3/0487; G06F 3/14; G06F 2200/1637; G09G 2340/0492; G06Q 50/01

See application file for complete search history.

(56) References Cited

U.S. PATENT DOCUMENTS

| | | | | |
|---|---|---|---|---|
| 8,325,151 | B1 * | 12/2012 | Chan ..................... | G06F 3/0487 345/173 |
| 8,810,512 | B2 * | 8/2014 | Andersson ............ | G06F 1/1626 345/158 |

(Continued)

OTHER PUBLICATIONS

Sensors; http://www.gsmarena.com/glossary.php3?term=sensors; as accsessed Aug. 9, 2017 (dated Dec. 2, 2011).

(Continued)

*Primary Examiner* — Andrey Belousov
(74) *Attorney, Agent, or Firm* — FisherBroyles, LLP

(57) ABSTRACT

Systems and methods for automatically changing application start state based on device orientation may include receiving a request to open an application, installed on a mobile device, capable of opening using at least two different open behaviors. Then, in response to receiving the request, the method may include (1) using one or more sensors of the mobile device to detect a physical orientation of the mobile device at the time the request is received and (2) opening the application by (i) opening the application using a first open behavior based at least in part on detecting a first orientation of the mobile device or (ii) opening the application using a second open behavior based at least in part on detecting a second orientation of the mobile device. Various other methods, systems, and computer-readable media are also disclosed.

20 Claims, 8 Drawing Sheets

(51) Int. Cl.
 *G06F 1/16* (2006.01)
 *G06F 3/0485* (2013.01)
 *G06Q 50/00* (2012.01)

(56) References Cited

U.S. PATENT DOCUMENTS

| | | | |
|---|---|---|---|
| 9,413,876 B2* | 8/2016 | Yim | H04M 1/72577 |
| 2011/0083101 A1* | 4/2011 | Sharon | H04L 67/22 |
| | | | 715/800 |
| 2016/0014264 A1* | 1/2016 | Yim | H04M 1/72519 |
| | | | 455/411 |
| 2018/0174060 A1* | 6/2018 | Velez-Rojas | H04W 4/02 |

OTHER PUBLICATIONS

Touchscreen; https://en.wikipedia.org/wiki/Touchscreen; as accessed Aug. 21, 2017 (dated Jul. 13, 2004).

iPhone 4 Gyroscope Teardown; https://www.ifixit.com/Teardown/iPhone+4+Gyroscope+Teardown/3156; as accessed Aug. 22, 2017 (dated Nov. 11, 2013).

Vibrating Structure Gyrescope; https://en.wikipedia.org/wiki/Vibrating_structure_gyroscope#MEMS_gyroscope; as accessed Aug. 28, 2017 (dated Apr. 7, 2005).

* cited by examiner

SYSTEMS AND METHODS FOR AUTOMATICALLY CHANGING APPLICATION START STATE BASED ON DEVICE ORIENTATION

BACKGROUND

Many mobile applications may be used to perform two or more functionalities. For example, a social networking application may allow a user to browse a newsfeed showing pictures and/or text posted by other users and may also allow the user to take a photo using the user's mobile device in order to share the picture with other users (e.g., by posting the photo and/or by sending the photo in a message).

Often, the different functionalities of the application may present different interfaces. Using the example of the social networking application, the application's browsing functionality may present a window with scrollable content, while the application's photo-taking functionality may present a window showing an image that may be captured by a camera of the user's mobile device.

Traditionally, multi-functional mobile applications have a single default start state that always presents the same window. As such, if the user is opening the application intending to use a different functionality than the functionality corresponding to the default start state, the user will be required to interact with the application in some way to change the window being presented by the application. For example, if a social networking application is set to always open by presenting a newsfeed, and the user s opening the social networking application to take a photo, the user would need to change the window being presented by the application to utilize the application's photo-taking functionality. This may, at a minimum, inconvenience the user, and if the moment the user would like to photograph is time-sensitive, cause the user to miss the moment he or she would like to photograph. The disclosed systems and methods, therefore, identify a need for improved systems and methods for selecting an application's start state.

SUMMARY

As will be described in greater detail below, the instant disclosure describes various systems and methods for automatically changing application start state based on device orientation. In one example, a method for automatically changing application start state may include receiving a request to open an application that is installed on a mobile device and is capable of opening using at least two different open behaviors. Then, in response to receiving the request, the method may include (1) using one or more sensors of the mobile device to detect a physical orientation of the mobile device at the time the request is received and (2) opening the application by (i) opening the application using a first open behavior based at least in part on detecting a first orientation of the mobile device or (ii) opening the application using a second open behavior based at least in part on detecting a second orientation of the mobile device.

In some examples, the first open behavior may include presenting a scrollable newsfeed via a display element of the mobile device. In these examples, the first orientation may represent a substantially horizontal orientation.

In one embodiment, the second open behavior may include (1) accessing a camera of the mobile device such that the application may capture an image using the camera and (2) presenting the image that may be captured via a display element of the mobile device. In this embodiment, the second orientation may represent a substantially vertical orientation. In some such embodiments, the method may further include accessing a front-facing camera of the mobile device based at least in part on determining that an angle of the mobile device in the substantially vertical orientation is within a first range. Alternatively, the method may further include accessing a back-facing camera of the mobile device based at least in part on determining that the angle of the mobile device in the substantially vertical orientation is within a second range.

In one example, the application may represent a photograph-sharing application managed by a social-networking platform. In some embodiments, the one or more sensors may include a gyroscope and/or an accelerometer.

In some examples, the method may further include, prior to receiving the request, identifying (1) multiple first-behavior instances in which a user opened the application on the mobile device and, upon opening the application, manually selected for the application to open using the first open behavior and (2) multiple second-behavior instances in which the user opened the application on the mobile device and, upon opening the application, manually selected for the application to open using the second open behavior. In these examples, the method may further include, prior to receiving the request, using machine learning to detect one or more features associated with the multiple first-behavior instances and/or the multiple second-behavior instances (e.g., a time of day, a day of the week, a time of year, a location, a user demographic, a usage pattern, etc.). In one embodiment, the method may also include, after receiving the request, (1) detecting, at the time of the request, at least one of the one or more features and (2) determining whether to open the application using the first open behavior or the second open behavior based additionally on the features detected at the time of the request.

In some examples, the method may also include determining that (1) after opening the application using the first open behavior, a user of the mobile device manually changed the application to exhibit the second open behavior, or (2) after opening the application using the second open behavior, the user manually changed the application to exhibit the first open behavior. In these examples, the method may also include, in response to the determination, adjusting a policy for determining whether to open the application on the mobile device using the first open behavior or the second open behavior.

In addition, a corresponding system for automatically changing application open behavior may include several modules stored in memory, including (1) a receiving module, stored in memory of a mobile device, configured to receive a request to open an application that is installed on the mobile device and is capable of opening using at least two different open behaviors and (2) an open module, stored in the memory of the mobile device, that, after the receiving module receives the request, is configured to (i) use one or more sensors of the mobile device to detect a physical orientation of the mobile device at the time the request is received and (ii) open the application by (A) opening the application using a first open behavior based at least in part on detecting a first orientation of the mobile device or (B) opening the application using a second open behavior based at least in part on detecting a second orientation of the mobile device.

In some examples, the above-described method may be encoded as computer-readable instructions on a non-transitory computer-readable medium. For example, a non-transitory computer-readable medium may include one or more computer-executable instructions that, when executed by at least one processor of a computing device, may cause the computing device to receive a request to open an application that is installed on the mobile device and is capable of opening using at least two different open behaviors and, in response to receiving the request, (1) use one or more sensors of the mobile device to detect a physical orientation of the mobile device at the time the request received and (2) open the application by (i) opening the application using a first open behavior based at least in part on detecting a first orientation of the mobile device or (ii) opening the application using a second open behavior based at least in part on detecting a second orientation of the mobile device.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
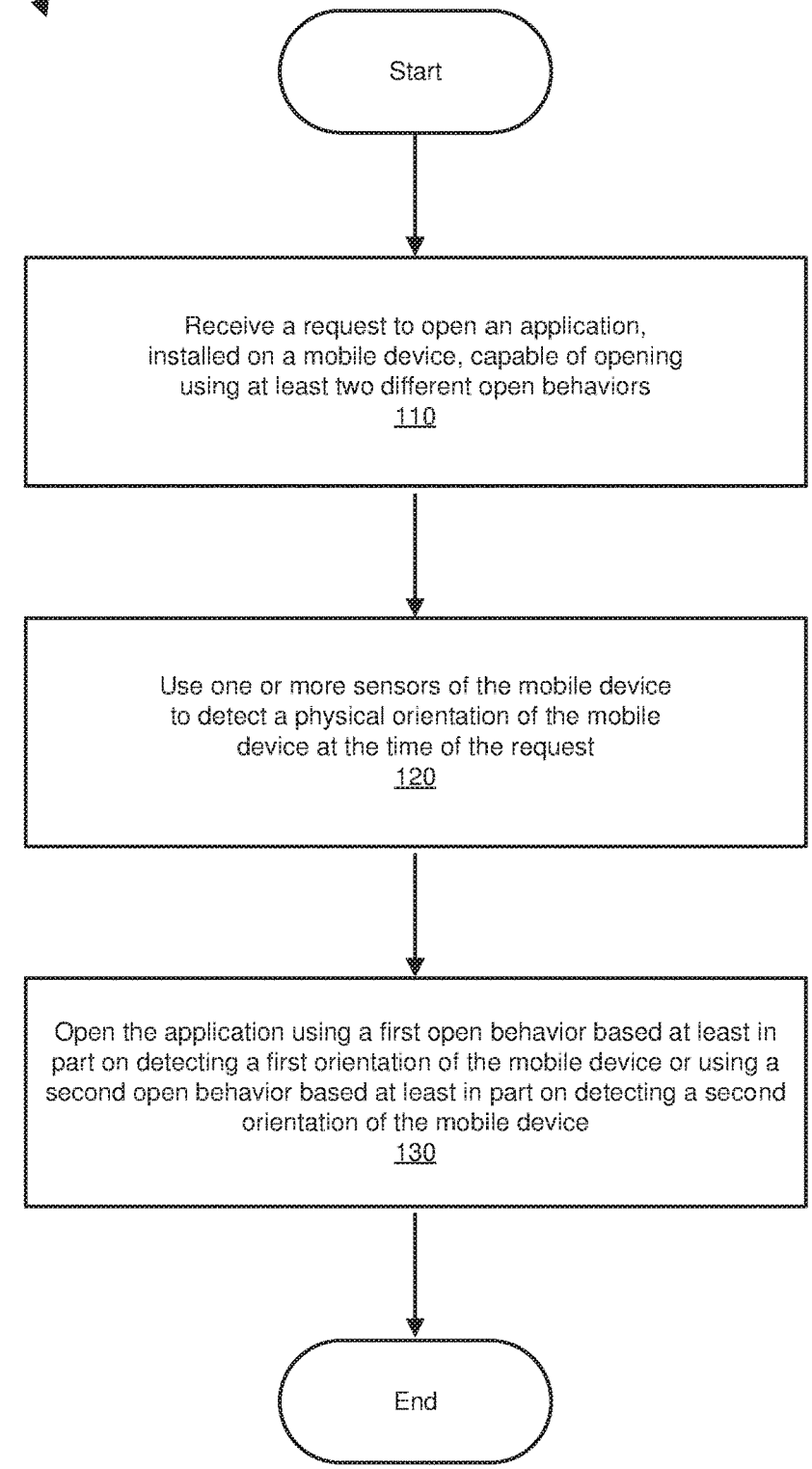
FIG. 1 is a flow diagram of an exemplary method for automatically changing application start state based on device orientation.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for automatically changing application start state based on device orientation. As will be explained in greater detail below, embodiments of the instant disclosure may (1) identify the orientation of a mobile device and (2) select the open behavior with which to open an application based on the identified orientation. In some examples, the disclosed systems and methods may utilize a policy indicating that a user who opens an application while holding his or her device in a first orientation is likely to want to use the application in one way, whereas a user who opens the application while holding his or her device in a second orientation is likely to want to use the application in a different way. For example, the policy may indicate that (1) a user who opens a social-networking application while holding his or her device in a substantially horizontal orientation is likely opening the application in order to browse a digital newsfeed but that (2) a user who opens the social networking application while holding the device in a substantially vertical orientation is likely opening the application in order to take a picture (e.g., in order to post the picture using the social-networking application). By predicting which of various open behaviors a user is interested in (i.e., based on input from sensors embedded in the device) and opening the application with the predicted open behavior, the disclosed systems and methods may increase the ease with which a user may interact with an application for his or her desired purposes.

The following will provide, with reference to FIG. 1, detailed descriptions of computer-implemented methods for automatically changing application start states based on device orientation. Detailed descriptions of corresponding example systems will also be provided in connection with FIG. 2. In addition, detailed descriptions of exemplary device orientations will be provided in connection with FIG. 3 (illustrating a substantially horizontal device orientation), FIG. 5 (illustrating a substantially vertical device orientation in which a device is angled away from a user), and FIG. 7 (illustrating a substantially vertical device orientation in which a device is angled toward a user). Also, detailed descriptions of exemplary open behaviors will be provided in connection with FIG. 4 (illustrating a newsfeed open behavior), FIG. 6 (illustrating a back-camera open behavior), and FIG. 8 (illustrating a front-camera open behavior).

FIG. 1 is a flow diagram of an exemplary computer-implemented method 100 for automatically changing application start state based on device orientation. The steps shown in FIG. 1 may be performed by any suitable computer-executable code and/or computing system, such as the systems described herein. In one embodiment, the steps shown in FIG. 1 may be performed by modules operating within a mobile device. For example, the steps shown in FIG. 1 may be performed by modules operating in a mobile device 202 as shown in exemplary system 200 in FIG. 2.

Figure 2:
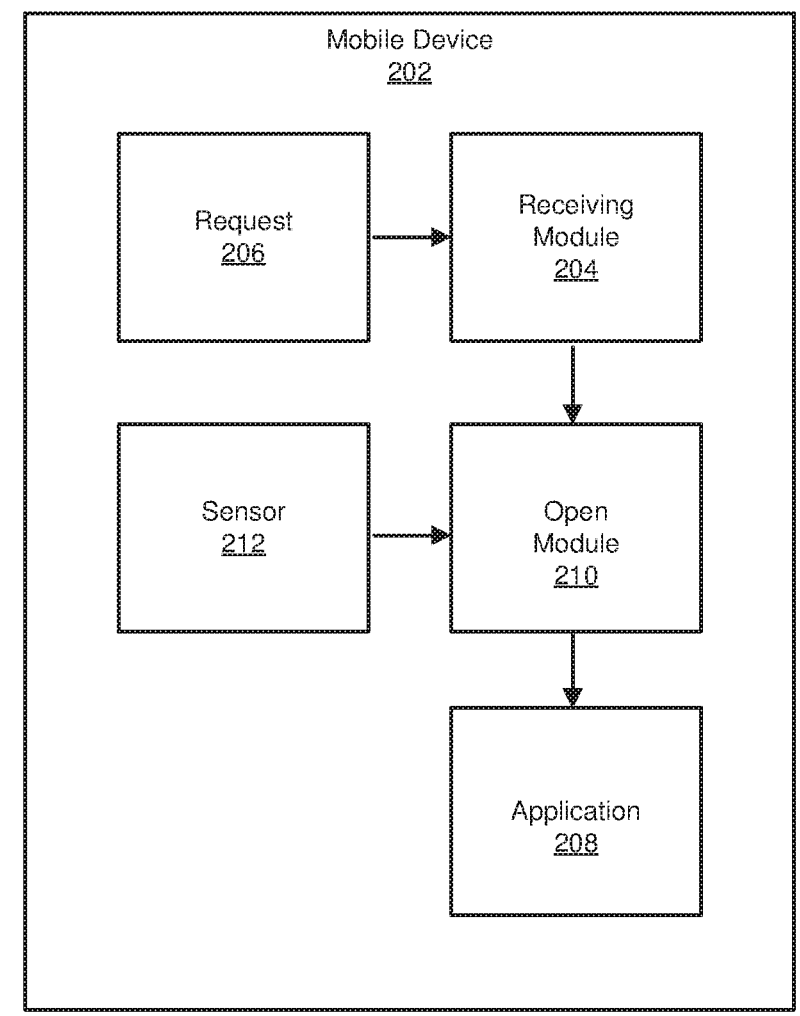
FIG. 2 is a block diagram of an exemplary system for automatically changing application start state based on device orientation.

As illustrated in FIG. 1, at step 110, one or more of the systems described herein may receive a request to open an application, installed on a mobile device, that is capable of opening using at least two different open behaviors. For example, as illustrated in FIG. 2, a receiving module 204, operating within mobile device 202, may receive a request 206 to open an application 208.

Mobile device 202 generally represents any type or form of computing device capable of reading computer-executable instructions. For example, mobile device 202 may represent a user device such as a smart phone and/or a tablet. Additional examples of mobile device 202 may include, without limitation, laptops, desktops with mobile elements, wearable devices, personal digital assistants (PDAs), etc. Application 208 generally represents any type or form of computer program that may be installed and executed on mobile device 202 to cause mobile device 202 to perform useful tasks. In one embodiment, application 208 may be capable of exhibiting two or more different open behaviors. In some examples, application 208 may represent a photograph-sharing application managed by a social-networking platform. In these examples, application 208 may be capable of exhibiting the following open behaviors: first, the behavior of displaying a scrollable newsfeed and, second, the behavior of displaying a camera-input window that may be used to take a picture via application 208.

Receiving module 204 may receive request 206 in response to a variety of triggers. In some embodiments, receiving module 204 may receive request 206 in response to receiving user input submitted to mobile device 202. In one example, the user input may be collected by one or more sensors embedded in mobile device 202. To give a specific example, mobile device 202 may represent a touchscreen device and receiving module 204 may receive request 206 in response to a physical gesture being detected, by sensors embedded in a touchscreen of mobile device 202, at a position on the touchscreen corresponding to an icon associated with application 208. As used herein, the term "touchscreen" generally refers to any type or form of input/output device, layered on top of and/or integrated with an electronic visual display of a mobile device, that receives input through physical gestures (such as a physical touch) received via the touchscreen.

Returning to FIG. 1, at step 120, one or more of the systems described herein may, in response to receiving the request, use one or more sensors of the mobile device to detect a physical orientation of the mobile device at the time of the request. For example, as illustrated in FIG. 2, an open module 210, operating within mobile device 202, may use sensor 212 to detect a physical orientation of mobile device 202 at the time request 206 is received.

Sensor 212 generally represents any type or form of sensor, embedded within a mobile device, configured to collect data indicative of a physical orientation of mobile device 202. In some examples, sensor 212 may represent a gyroscope. As used herein, the term "gyroscope" generally refers to any type or form of mechanical system embedded within a mobile device that collects rotational data indicative of an orientation of the mobile device. In one example, a gyroscope may refer to a vibrating structure gyroscope that determines a rate of rotation based on vibration data. Additionally or alternatively, sensor 212 may represent an accelerometer. As used herein, the term "accelerometer" generally refers to any type or form of mechanical system embedded in a mobile device that measures an acceleration of the mobile device. In one embodiment, open module 210 may rely on a combination of inputs from both a gyroscope and an accelerometer to identify the orientation of mobile device 202. In some embodiments, sensor 212 may represent a microelectromechanical system embedded within mobile device 202.

Figure 3:
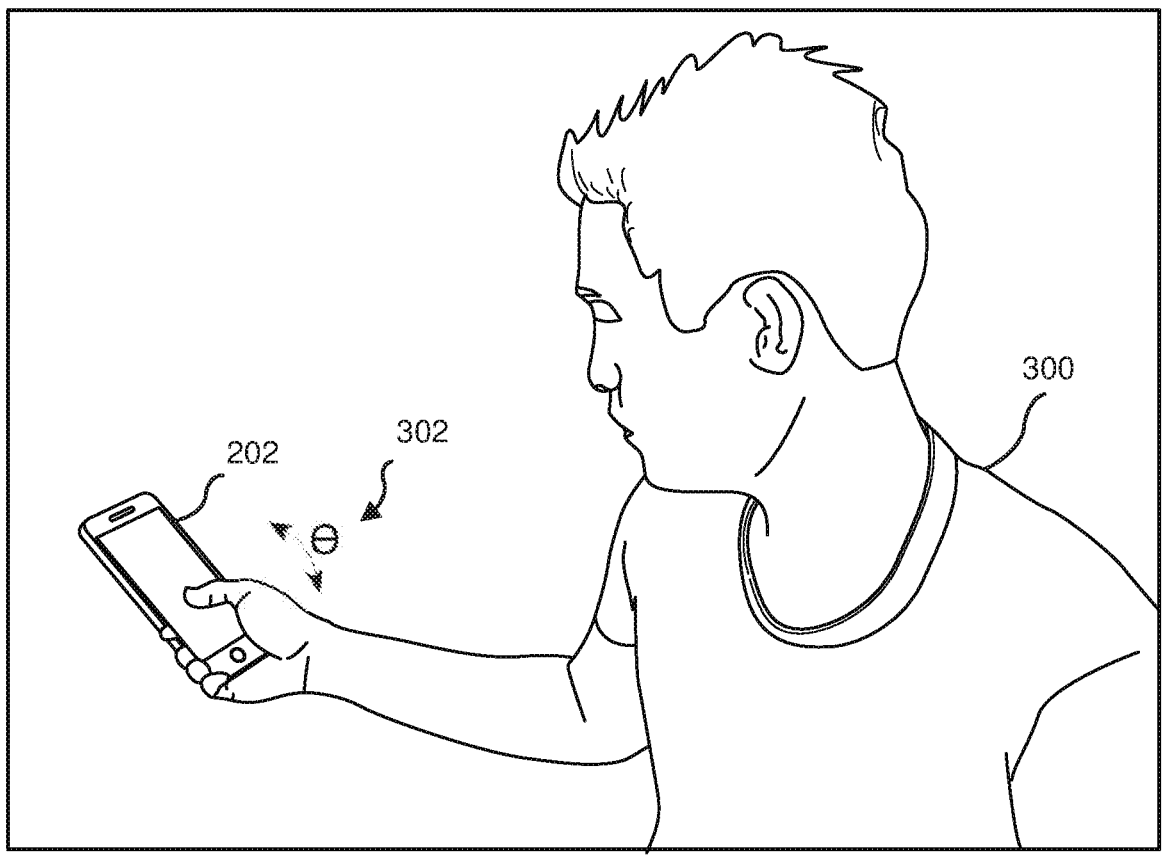
FIG. 3 is an illustration of an exemplary device orientation used to browse a digital newsfeed.
Figure 4:
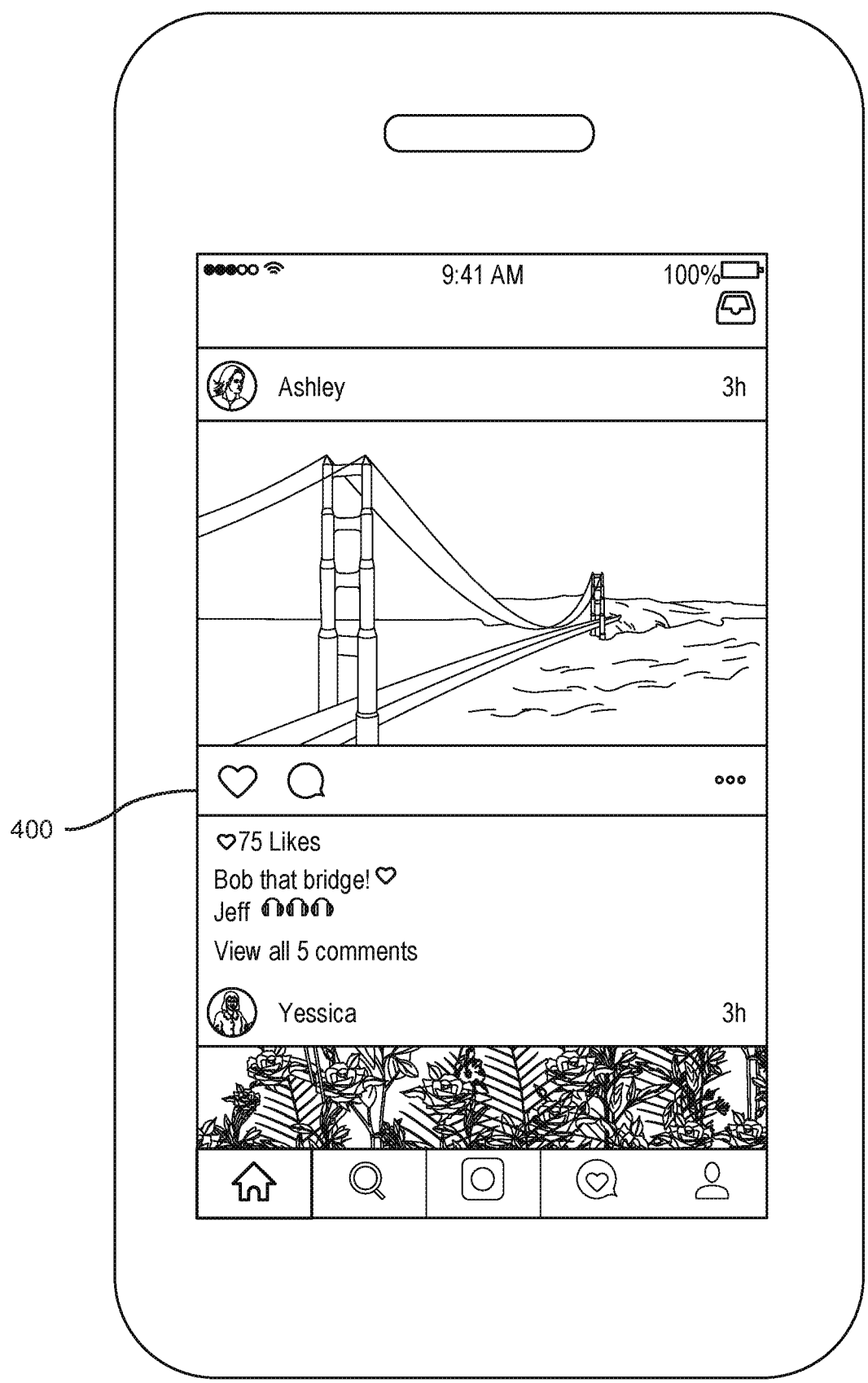
FIG. 4 is an illustration of an exemplary mobile device displaying an exemplary digital newsfeed.

Open module 210 may detect a variety of physical orientations. In one embodiment, open module 210 may detect that mobile device 202 is in a substantially horizontal orientation. Open module 210 may determine that mobile device 202 is in a substantially horizontal orientation in a variety of ways. In one example, as illustrated in FIG. 3, open module 210 may determine that mobile device 202 is in a substantially horizontal orientation based on an angle 302 at which mobile device 202 is oriented (e.g., relative to a floor and/or the user). For example, open module 210 may determine that mobile device 202 is in a substantially horizontal orientation if angle 302 falls within a predefined range of angles. The predefined range of angles may include any suitable range of angles. For example, the predefined range of angles may include, without limitation, a range of 0-10 degrees, 0-60 degrees, 5-20 degrees, etc. In some examples, the predefined range of angles may have been determined based on usage data collected from users (e.g., using machine-learning), as will be described in greater detail below.

Figure 5:
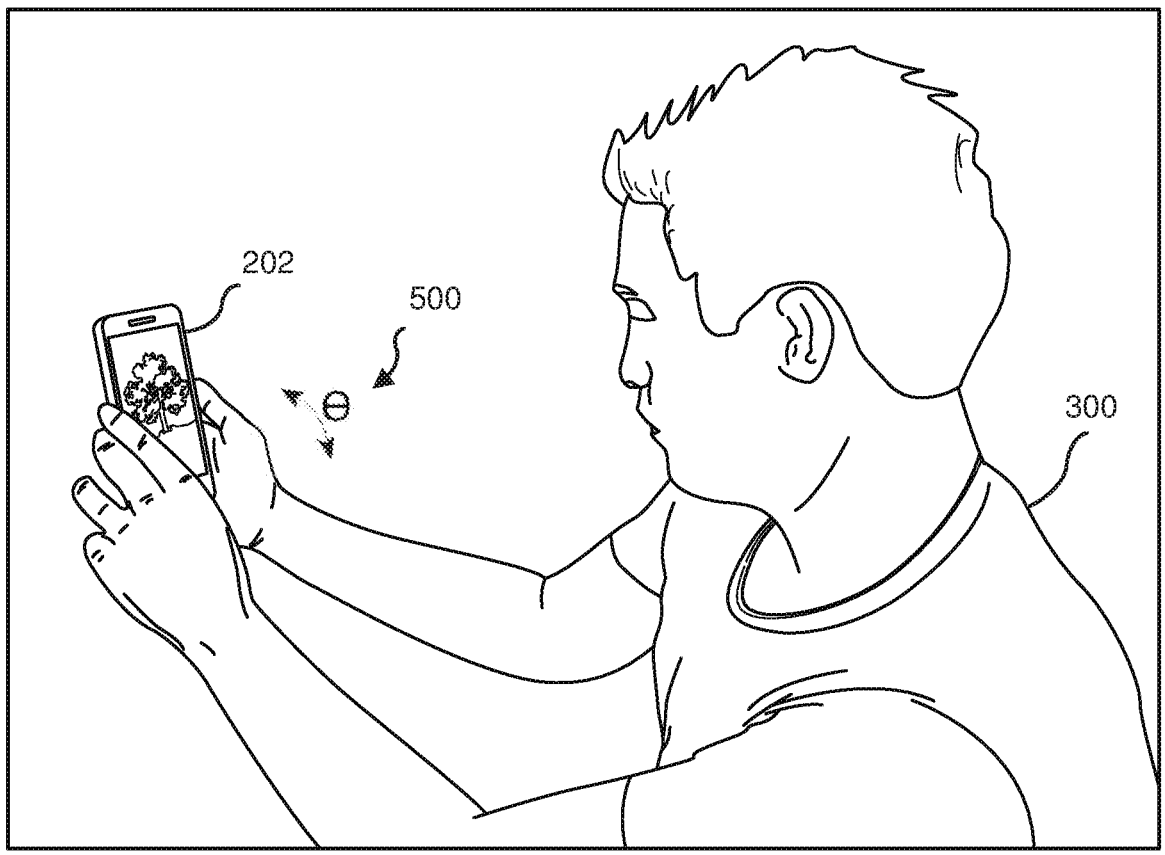
FIG. 5 is an illustration of an exemplary device orientation used to take a picture using a back-facing camera of an exemplary mobile device.

In other examples, open module 210 may detect that mobile device 202 is in a substantially vertical orientation. Open module 210 may determine that mobile device 202 is in a substantially vertical orientation in a variety of ways. Using FIGS. 5 and 7 as specific examples, open module 210 may determine that application 208 is in a substantially vertical orientation based on an angle 500 (illustrated in FIG. 5) or an angle 700 (illustrated in FIG. 7) at which mobile device 202 is oriented (e.g., relative to the floor and/or user 300). In some examples, open module 210 may determine that mobile device 202 is in a substantially vertical orientation if an angle at which mobile device 202 is oriented (e.g., angle 500 illustrated in FIG. 5 or angle 700 illustrated in FIG. 7) falls within a predefined range of angles. The predefined range of angles may include any suitable range of angles. For example, the predefined range of angles may include, without limitation, a range of 80-90, 60-90 degrees, 50-85 degrees, etc. In one embodiment, this predefined range of angles may have been determined based on usage data collected from users (e.g., using machine-learning), as will be described in greater detail below. In some examples, open module 210 may additionally determine whether a mobile device in a substantially vertical orientation is angled away from a user (as illustrated in FIG. 5) or toward a user (as illustrated in FIG. 7).

In some examples, open module 210 may infer a functionality of application 208 desired by the user based on the detected orientation of mobile device 202 (e.g., according to a policy indicating inferred relationships between device orientation and desired application functionality). For example, open module 210 may determine that a user 300 who opens application 208, while holding mobile device 202 in a substantially horizontal orientation (as illustrated in FIG. 3), is opening application 208 in order to browse a scrollable newsfeed of application 208 (e.g., such as a scrollable newsfeed 400 in FIG. 4). As another example, open module 210 may determine that a user who opens application 208 while holding mobile device 202 in a substantially vertical orientation (as illustrated in FIGS. 5 and 7) is opening application 208 in order to take a picture via application 208.

In some examples, open module 210 may, in addition to determining that a user is opening application 208 to take a picture, infer whether the user is opening application 208 to take a picture using a front-facing camera or a back-facing camera of mobile device 202. In one embodiment, open module 210 may infer which camera the user is intending to access based on whether mobile device 202 is angled toward the user or angled away from the user. Using FIG. 5 as a specific example, open module 210 may determine that if user 300 opens application 208 while holding mobile device 202 in a substantially vertical orientation at an angle (such as angle 500) that is angled away from himself (as illustrated in FIG. 5), he is opening application 208 in order to take a picture using a back-facing camera of mobile device 202. For example, as shown in FIG. 5, user 300 may be opening application 208 in order to take a picture of a tree (i.e., to capture image 600 illustrated in FIG. 6).

Figure 7:
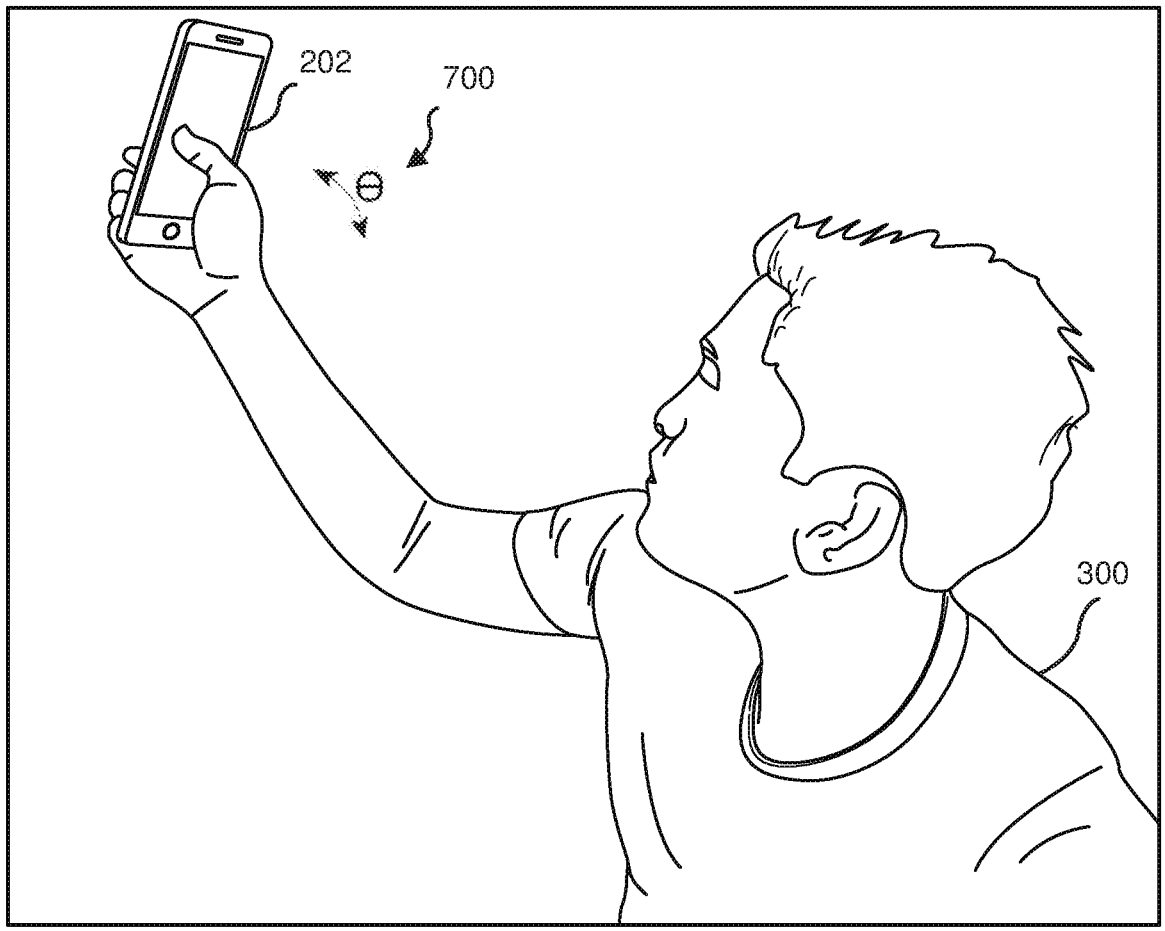
FIG. 7 is an illustration of an exemplary device orientation used to take a self-image using a front-facing camera of the device.
Figure 8:
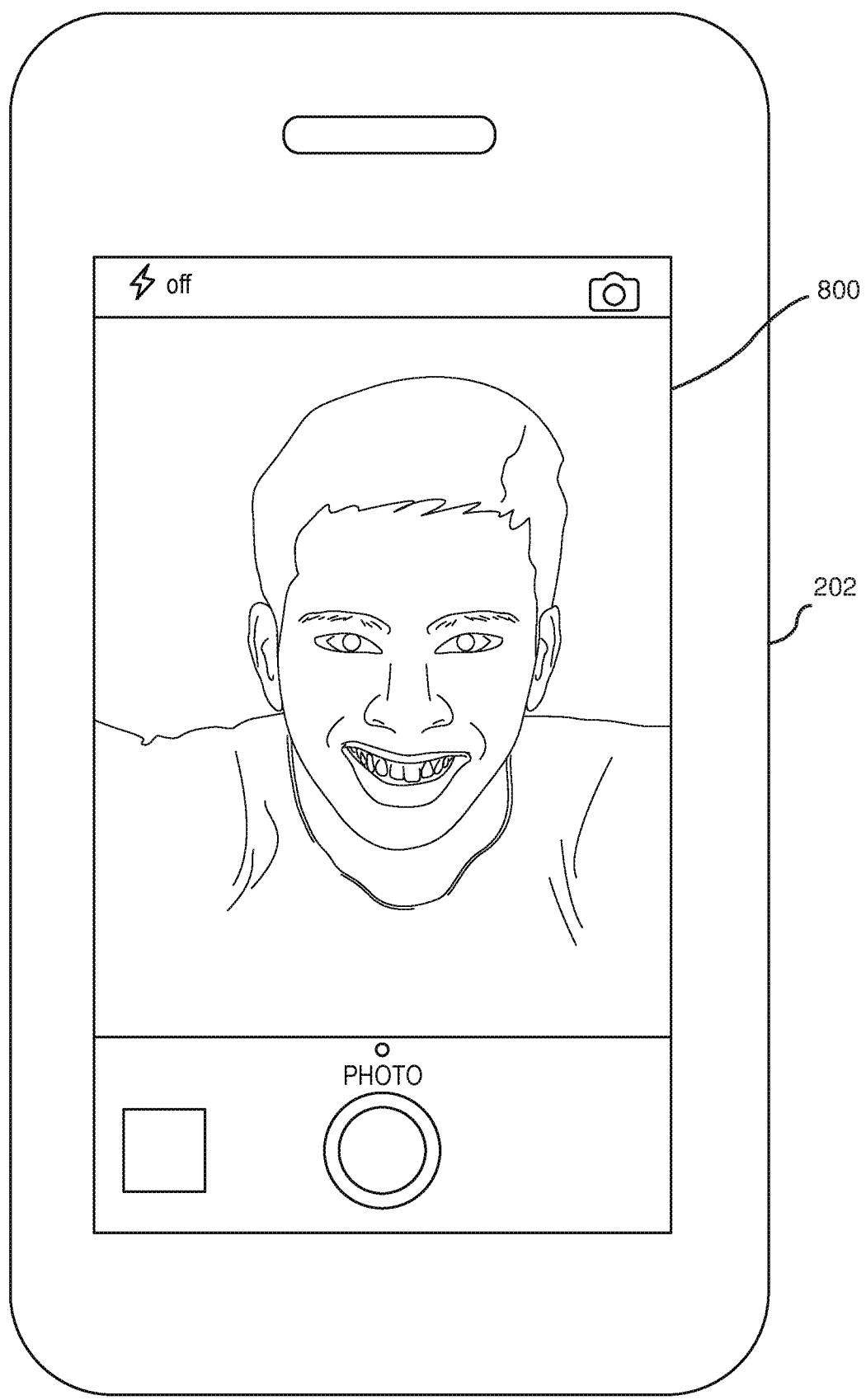
FIG. 8 is an illustration of an exemplary mobile device displaying an exemplary self-image being captured by a device's front-facing camera.

In contrast, using FIG. 7 as a specific example, open module 210 may determine that a user 300, who opens application 208 while holding mobile device 202 in a substantially vertical orientation at an angle (such as angle 700) that is angled toward himself, is opening application 208 in order to take a picture using a front-facing camera of mobile device 202. For example, as shown in FIG. 7, user 300 may be opening application 208 to take a picture of himself to capture self-image 800 in FIG. 8).

Returning to FIG. 1, at step 130, after using one or more sensors to detect a physical orientation of the mobile device, one or more of the systems described herein may open the application using an open behavior selected based on the physical orientation of the mobile device. For example, as illustrated in FIG. 2, open module 210, operating within mobile device 202, may open application 208 using a first open behavior based at least in part on detecting a first orientation of mobile device 202 or using a second open behavior based at least in part on detecting a second orientation of mobile device 202.

To give a specific example, open module 210 may, in response to determining that mobile device 202 is oriented in a substantially horizontal position, open application 208 using a first open behavior. For example, open module 210 may, in response to determining that mobile device 202 is oriented in the substantially horizontal orientation illustrated in FIG. 3, open application 208 by displaying a scrollable newsfeed (e.g., newsfeed 400 illustrated in FIG. 4) in a display element of mobile device 202.

By contrast, open module 210 may, in response to determining that mobile device 202 is oriented in a substantially vertical position, open application 208 using a second open behavior. For example, open module 210 may, in response to determining that mobile device 202 is oriented in the substantially vertical orientation illustrated in FIG. 5 or the substantially vertical orientation illustrated in FIG. 7, open application 208 by (1) accessing a camera of mobile device 202 such that application 208 may capture an image using the camera (e.g., image 600 in FIG. 6 and/or self-image 800 in FIG. 8) and (2) displaying the image that may be captured by the camera in a display element of mobile device 202.

In some examples, as mentioned above, mobile device 202 may include a front-facing camera and a back-facing camera. In these examples, open device 202 may determine to open application 208 by accessing the back-facing camera if the substantially vertical orientation of mobile device 202 is within a first range (e.g., a range that is angled away from the user) or by accessing the front-lacing camera if the substantially vertical orientation of mobile device 202 is within a second range (e.g., a range that is angled toward the user).

Figure 6:
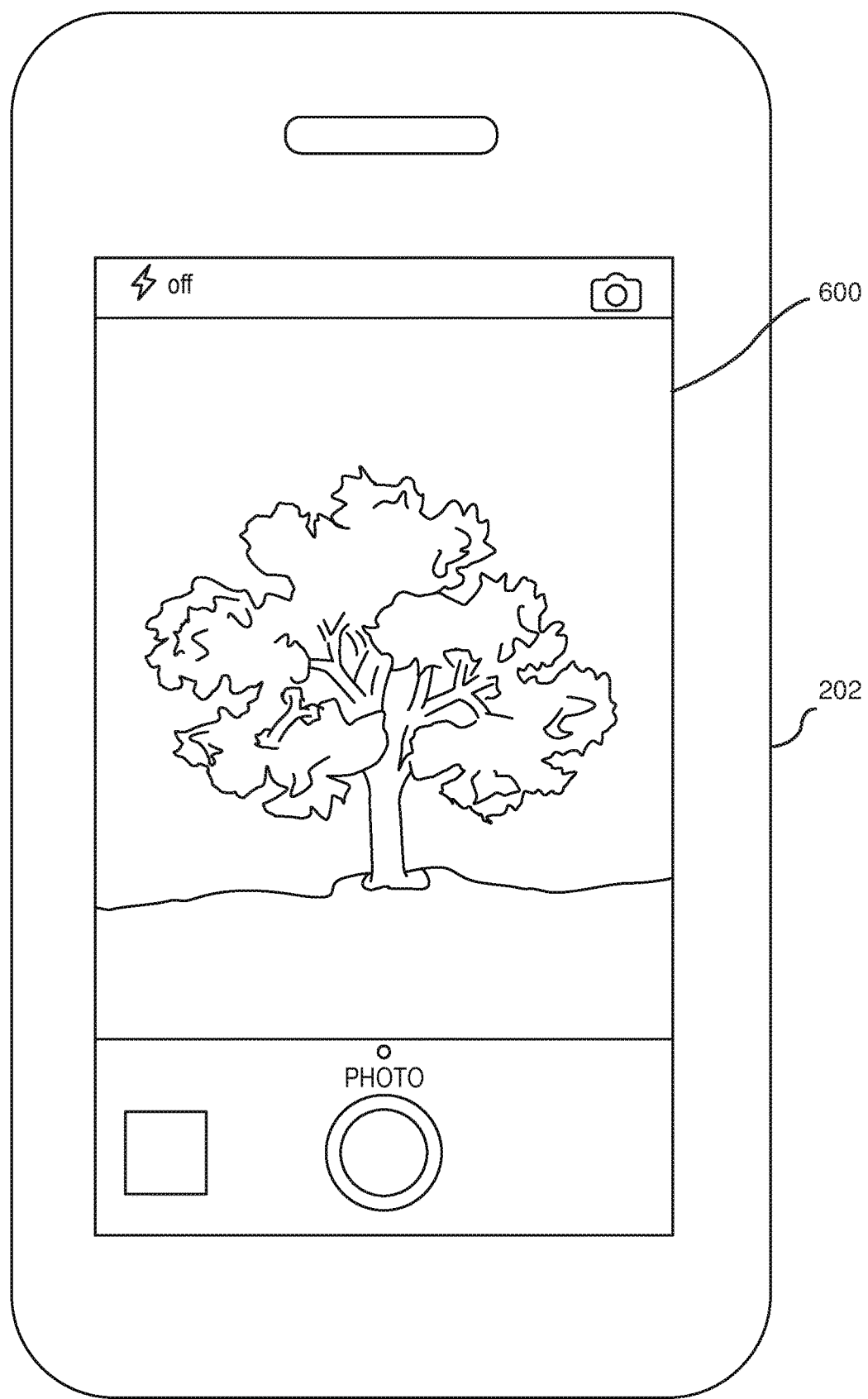
FIG. 6 is an illustration of an exemplary mobile device displaying an exemplary image being captured by a device's back-facing camera.

Using FIGS. 5-6 as a specific example, open module 210 may, in response to determining that mobile device 202 is oriented in a substantially vertical position that is angled away from user 300 (e.g., at angle 500 illustrated in FIG. 5), open application 208 by (1) accessing a back-facing camera of mobile device 202 such that application 208 may capture image 600 illustrated in FIG. 6 using the back-facing camera and (2) displaying image 600 in a display element of mobile device 202. Alternatively, using FIGS. 7-8 as a specific example, open module 210 may, in response to determining that mobile device 202 is oriented in a substantially vertical position that is angled toward user 300 (e.g., at angle 700 illustrated in FIG. 7), open application 208 by (1) accessing a front-facing camera of mobile device 202 such that application 208 may capture self-image 800 illustrated in FIG. 8 using the front-facing camera and (2) displaying self-image 800 via a display element of mobile device 202.

In some examples (e.g., prior to receiving request 206), the disclosed systems and methods may use machine learning to detect one or more features that are indicative of a particular open behavior desired by users opening application 208. For example, the disclosed systems and methods may (1) identify first-behavior instances in which a user opened an instance of application 208 on a mobile device and, upon opening the instance of application 208, manually selected for the instance of application 208 to open using the first open behavior, and (2) identify second-behavior instances in which a user opened an instance of application 208 on a mobile device and, upon opening the instance of application 208, manually selected for the instance of application 208 to open using the second open behavior. The disclosed systems and methods may identify the first-behavior instances and the second-behavior instances in a variety of ways. In some examples, the disclosed systems and methods may rely on data collected via crowdsourcing. Additionally or alternatively, the disclosed systems and methods may rely on data collected from a test group.

After identifying the first-behavior instances and the second-behavior instances, the disclosed systems and methods may collect data identifying a range of orientations of the mobile devices used by the users in the first-behavior instances and a range of orientations of the mobile devices used by the users in the second-behavior instances. Based on the identified ranges of orientations, the disclosed systems and methods may use machine learning to detect relationships between device-orientation and the user-selected open behaviors. Then, in one embodiment, the disclosed systems and methods may create a policy that (1) indicates which application behavior is likely desired by a user based on an orientation of the user's mobile device at the time the user opens the application and (2) includes an instruction to open the application using the indicated open-behavior.

In some examples, the disclosed systems and methods may (e.g., in addition to identifying orientation information in the first-behavior instances and the second-behavior instances), identify one or more additional features associated with the first-behavior instances and/or with the second-behavior instances. The additional features may include, without limitation, a time of day, a day of the week, a time of year, a location, a user demographic, and/or a usage pattern. Based on the identified additional features, the disclosed systems and methods may use machine learning to detect relationships between the additional features and the user-selected open behaviors. Then, in one embodiment, the disclosed systems and methods may create policy for determining whether to open application 208 using the first or the second open behavior that is based additionally on the additional features.

In this embodiment, open module 210 may be configured to determine which open behavior to use to open application 208 based additionally on one or more of the additional features. For example, open application 208 may determine which open behavior to use to open application 208 by (1) detecting, at the time of request 206, an orientation of mobile device 202 and one or more of the additional features and (2) determining whether to open application 208 using the first open behavior or the second open behavior based on both the detected orientation and the detected additional features (e.g., as dictated by a policy).

In some embodiments, the disclosed systems and methods may be configured to customize open behavior for a particular user. For example, after open module 210 opens application 208 using the open behavior selected in step 130, the disclosed systems and methods may determine that the user of mobile device 202 manually changed the application to exhibit a different open behavior within a threshold amount of time. To give a specific example, open module 210 may have opened application 208 using the first open behavior and the user may have manually changed the application to exhibit the second open behavior within a threshold amount of time (e.g., five seconds). Conversely, open module 210 may have opened application 208 using the second open behavior and the user may have manually changed the application to exhibit the first open behavior within the threshold amount of time. In these examples, the disclosed systems and methods may adjust a policy for opening application 208 on mobile device 202 based on the determination that the user manually changed the application to exhibit the different open behavior. Additionally or alternatively, the disclosed systems and methods may customize the open behavior by collecting information about additional features of day, location, etc.) and refining the policy for opening application 208 based on the collected information.

As described above, the systems and methods described herein disclose using an orientation of a mobile device to determine a state in which to launch an application. For example, the system may launch an application into a reading state when the mobile device is oriented in a position typically used for browsing and reading, or launch the application into a back-camera state when the device is oriented in a position typically used for taking photos, or launch the application into a front-camera state when the device is oriented in a position typically used for taking self-images. The system may use mobile device sensors (e.g., gyroscopes, accelerometers, etc.) to detect the orientation of the phone and may use machine learning to associate start states with particular orientations and/or with various additional features (e.g., time of day, location, etc.).

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

The term "memory device," as used herein, generally represents any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In addition, the term "physical processor," as used herein, generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive device orientation data, transform the device orientation data into a start state determination, and open an application according to the determined start state. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including"

and "having" (and their derivatives), as used in the specification and claims, are interchangeable with and have the same meaning as the word "comprising."

What is claimed is:

1. A computer-implemented method comprising:
identifying a plurality of instances in which a user (1) opened a social media application, which enables users to both (i) browse a digital newsfeed via a scrollable newsfeed interface of the social media application and (ii) take and post pictures via a camera-input interface of the social media application, on a mobile device and, upon opening the social media application, (2) manually selected for the social media application to present the scrollable newsfeed interface;
identifying an additional plurality of instances in which a user (1) opened the social media application on a mobile device and, upon opening the social media application, (2) manually selected for the social media application to present the camera-input interface;
using machine learning to detect one or more features associated with at least one of the plurality of instances or the additional plurality of instances;
after detecting the one or more features, receiving a request to open an instance of the social media application on a particular mobile device; and
in response to receiving the request:
using one or more sensors of the particular mobile device to determine a physical orientation of the particular mobile device at the time the request is received;
detecting at least one of the one or more features; and
determining whether to open the instance of the social media application by presenting the scrollable newsfeed interface or by presenting the camera-input interface of the instance of the social media application based on (1) the at least one feature detected at the time of the request and (2) the determined physical orientation of the particular mobile device.

2. The computer-implemented method of claim 1, further comprising opening the instance of the social media application by presenting the camera-input interface, wherein presenting the camera-input interface comprises (1) accessing a camera of the particular mobile device such that the instance of the social media application may capture an image using the camera and (2) presenting the image that may be captured via the camera-input interface.

3. The computer-implemented method of claim 2, wherein accessing the camera of the particular mobile device comprises:
accessing a front-facing camera of the particular mobile device based at least in part on determining that an angle of the particular mobile device's physical orientation is within a first predetermined range; or
accessing a back-facing camera of the particular mobile device based at least in part on determining that the angle of the particular mobile device's physical orientation is within a second predetermined range.

4. The computer-implemented method of claim 1, wherein the one or more sensors comprise a gyroscope.

5. The computer-implemented method of claim 1, wherein the one or more sensors comprise an accelerometer.

6. The computer-implemented method of claim 1, further comprising opening the instance of the social media application by presenting the scrollable newsfeed interface.

7. The computer-implemented method of claim 1, wherein the one or more features comprise at least one of:
a time of day;
a day of the week; or
a time of year.

8. The computer-implemented method of claim 1, wherein the one or more features comprise at least one of:
a location;
a user demographic; or
a usage pattern.

9. The computer-implemented method of claim 1, further comprising:
determining that:
after opening the instance of the social media application by presenting the scrollable newsfeed interface, a user of the particular mobile device manually changed the instance of the social media application to present the camera-input interface; or
after opening the instance of the social media application by presenting the camera-input interface, the user of the particular mobile device manually changed the instance of the social media application to present the scrollable newsfeed interface; and
in response to the determination, adjusting a policy for determining whether to open the instance of the social media application by presenting the scrollable newsfeed interface or the camera-input interface.

10. A system comprising:
a receiving module, stored in memory of a computing device and executed by a processor of the computing device, that:
identifies a plurality of instances in which a user (1) opened a social media application, which enables users to both (i) browse a digital newsfeed via a scrollable newsfeed interface of the social media application and (ii) take and post pictures via a camera-input interface of the social media application, on a mobile device and, upon opening the social media application, (2) manually selected for the social media application to present the scrollable newsfeed interface;
identifies an additional plurality of instances in which a user (1) opened the social media application on a mobile device and, upon opening the social media application, (2) manually selected for the social media application to present the camera-input interface;
uses machine learning to detect one or more features associated with at least one of the plurality of instances or the additional plurality of instances; and
after detecting the one or more features, receives a request to open an instance of the social media application on a particular mobile device;
an open module, stored in the memory of the computing device and executed by the processor of the computing device, that, after the receiving module receives the request, is configured to:
use one or more sensors of the particular mobile device to determine a physical orientation of the particular mobile device at the time the request is received;
detect at least one of the one or more features; and
determine whether to present the scrollable newsfeed interface or the camera-input interface of the instance of the social media application based on (1) the at least one feature detected at the time of the request and (2) the determined physical orientation of the particular mobile device.

11. The system of claim 10, wherein the open module is further configured to open the instance of the social media application by presenting the camera-input interface, wherein presenting the camera-input interface comprises (1) accessing a camera of the particular mobile device such that the instance of the social media application may capture an image using the camera and (2) presenting the image that may be captured via the camera-input interface.

12. The system of claim 10, wherein the one or more sensors comprise a gyroscope.

13. The system of claim 10, wherein the one or more sensors comprise an accelerometer.

14. The system of claim 10, wherein the open module is further configured to open the instance of the instance of the social media application by presenting the scrollable newsfeed interface.

15. A non-transitory computer-readable medium comprising one or more computer-executable instructions that, when executed by at least one processor of a computing device, cause the computing device to:
  identify a plurality of instances in which a user (1) opened a social media application, which enables users to both (i) browse a digital newsfeed via a scrollable newsfeed interface of the social media application and (ii) take and post pictures via a camera-input interface of the social media application, on a mobile device and, upon opening the social media application, (2) manually selected for the social media application to present the scrollable newsfeed interface;
  identify an additional plurality of instances in which a user (1) opened the social media application on a mobile device and, upon opening the social media application, (2) manually selected for the social media application to present the camera-input interface;
  use machine learning to detect one or more features associated with at least one of the plurality of instances or the additional plurality of instances;
  after detecting the one or more features, receive a request to open an instance of the social media application on a particular mobile device; and
  in response to receiving the request:
    use one or more sensors of the particular mobile device to determine a physical orientation of the particular mobile device at the time the request is received;
    detect at least one of the one or more features; and
    determine whether to present the scrollable newsfeed interface or the camera-input interface of the instance of the social media application based on (1) the at least one feature detected at the time of the request and (2) the determined physical orientation of the particular mobile device.

16. The non-transitory computer-readable medium of claim 15, wherein the instructions further cause the computing device to open the instance of the social media application by presenting the camera-input interface, wherein presenting the camera-input interface comprises:
  accessing a camera of the particular mobile device such that the instance of the social media application may capture an image using the camera; and
  presenting the image that may be captured via the camera-input interface.

17. The non-transitory computer-readable medium of claim 16, wherein accessing the camera of the particular mobile device comprises:
  accessing a front-facing camera of the particular mobile device based at least in part on determining that an angle of the particular mobile device's orientation is within a first predetermined range; or
  accessing a back-facing camera of the particular mobile device based at least in part on determining that the angle of the particular mobile device's orientation is within a second predetermined range.

18. The non-transitory computer-readable medium of claim 15, wherein the one or more sensors comprise at least one of a gyroscope or an accelerometer.

19. The computer-implemented method of claim 1, wherein identifying the plurality of instances and the additional plurality of instances comprises identifying the plurality of instances and the additional plurality of instances via crowd-surfing.

20. The computer-implemented method of claim 1, wherein identifying the plurality of instances and the additional plurality of instances comprises identifying the plurality of instances and the additional plurality of instances for a particular user.

* * * * *